United States Patent
Sunden et al.

(10) Patent No.: US 7,184,920 B2
(45) Date of Patent: Feb. 27, 2007

(54) DELAY MEASUREMENT SYSTEM

(75) Inventors: Hironobu Sunden, Yokohama (JP); Mitsunori Hamada, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 29 days.

(21) Appl. No.: 10/848,468

(22) Filed: May 18, 2004

(65) Prior Publication Data
US 2005/0159914 A1    Jul. 21, 2005

(30) Foreign Application Priority Data
Jan. 19, 2004    (JP) .............................. 2004-010919

(51) Int. Cl.
*G06F 19/00* (2006.01)

(52) U.S. Cl. ................. 702/125; 702/31; 702/79; 702/80; 702/176; 709/236; 709/248; 365/194

(58) Field of Classification Search ............... 702/125, 702/31, 79, 80, 176; 709/236, 248; 370/530; 455/67.16; 365/194
See application file for complete search history.

(56) References Cited

U.S. PATENT DOCUMENTS

| | | | |
|---|---|---|---|
| 6,236,623 B1 * | 5/2001 | Read et al. ................ 368/46 |
| 6,674,730 B1 * | 1/2004 | Moerder ................... 370/316 |
| 6,681,099 B1 * | 1/2004 | Keranen et al. ......... 455/67.16 |
| 2003/0128741 A1 * | 7/2003 | Chun ........................ 375/132 |
| 2003/0152110 A1 * | 8/2003 | Rune ......................... 370/509 |
| 2003/0185571 A1 * | 10/2003 | Lee et al. ................. 398/102 |

FOREIGN PATENT DOCUMENTS

JP    2000-324535    11/2000

* cited by examiner

*Primary Examiner*—Marc S. Hoff
*Assistant Examiner*—Phuong Huynh
(74) *Attorney, Agent, or Firm*—Katten Muchin Rosenman LLP

(57) ABSTRACT

Performing delay measurement between master and slave devices. The master transmits a delay measuring signal at a fixed timing relative to a synchronous pattern signal in an overhead and transmits a frame signal in which an internal delay time, associated with a frame signal generation, from a delay measurement start timing to a transmission timing of the delay measuring signal is stored in the delay measuring signal as a master offset value. The slave adds an internal delay time associated with a frame signal generation to the master offset value of the frame signal, making a slave offset value and transmits an updated delay measuring signal with the slave offset value. The master calculates a delay time by subtracting the slave offset value from a time difference between a timing at which the delay measuring signal transmitted from the slave is received and the delay measurement start timing.

11 Claims, 10 Drawing Sheets

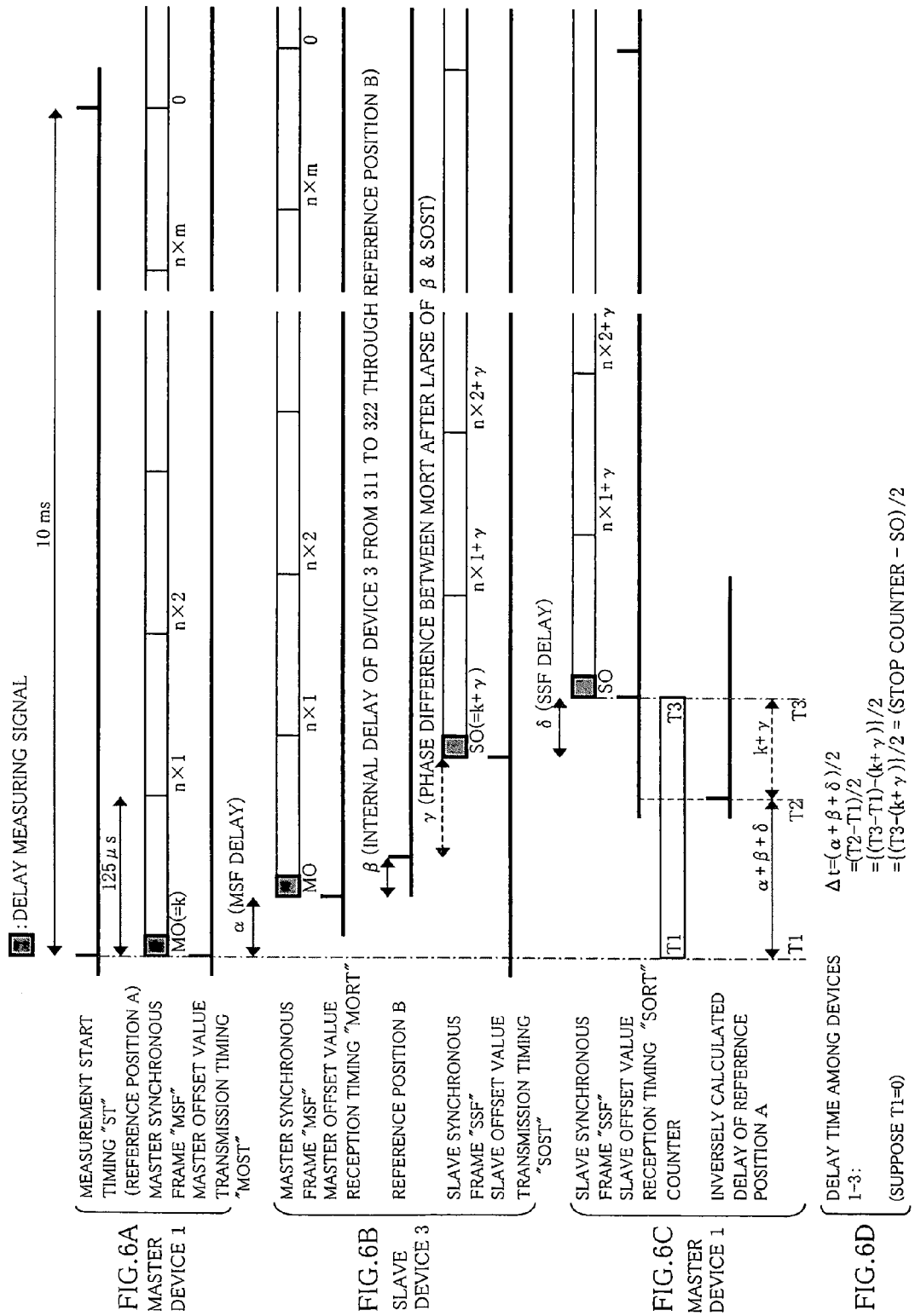

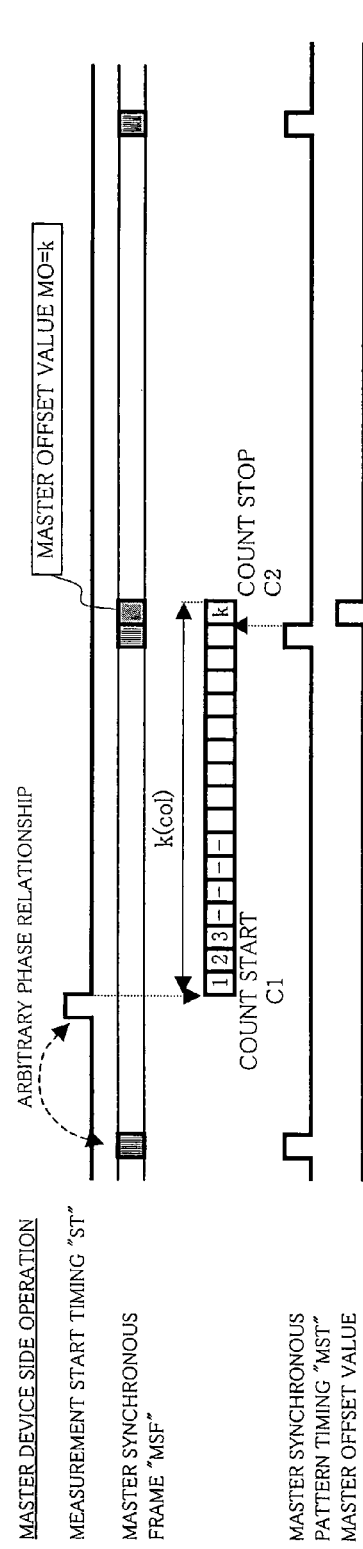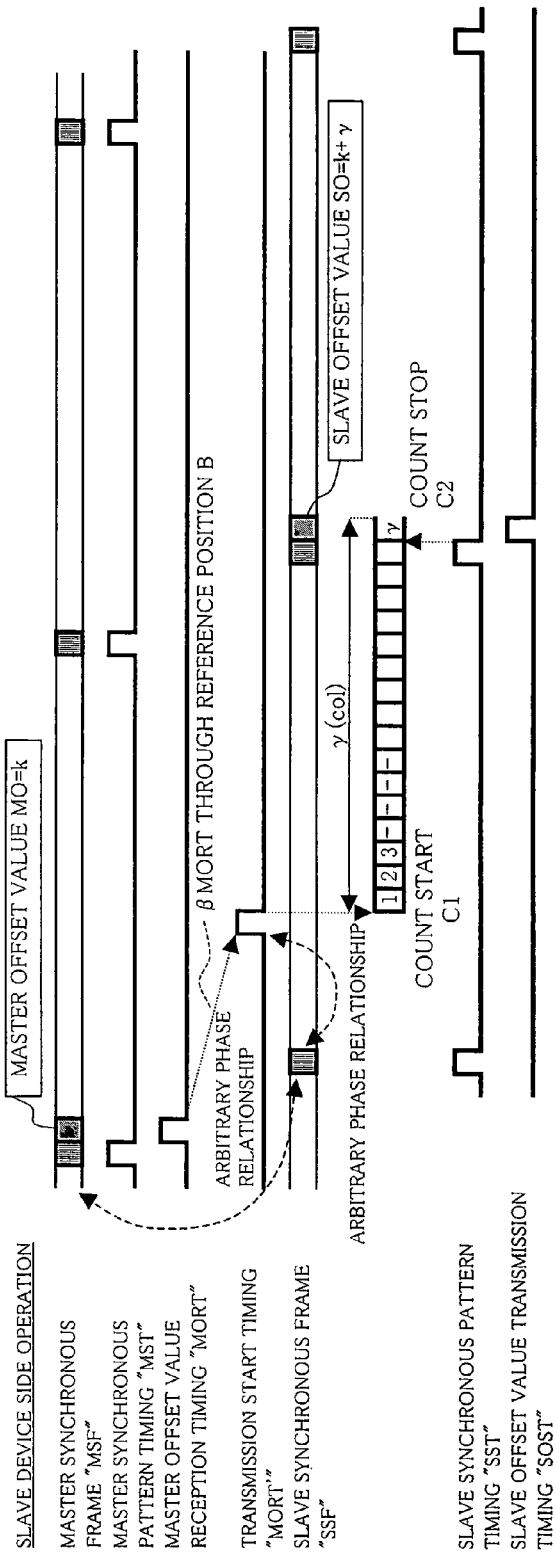

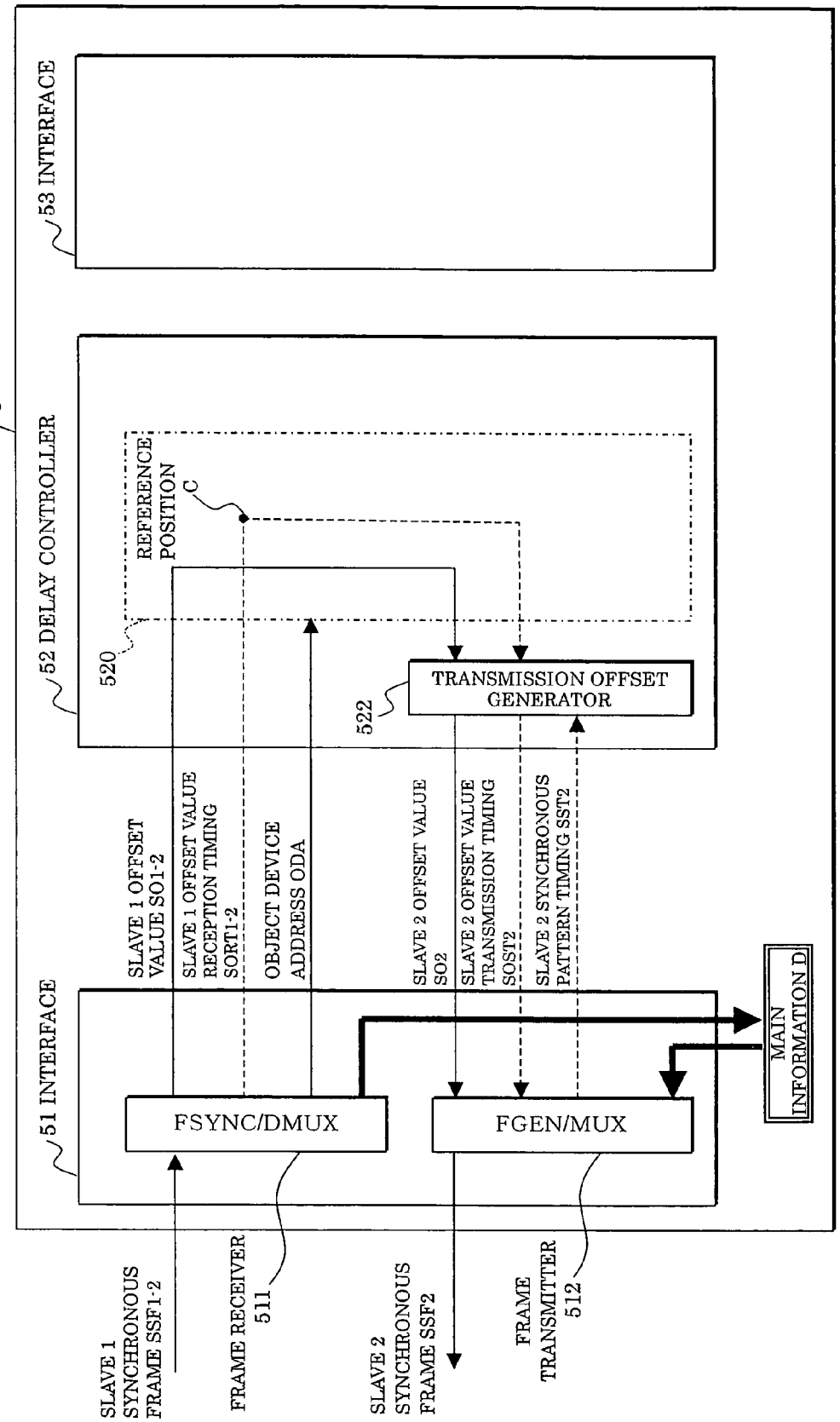

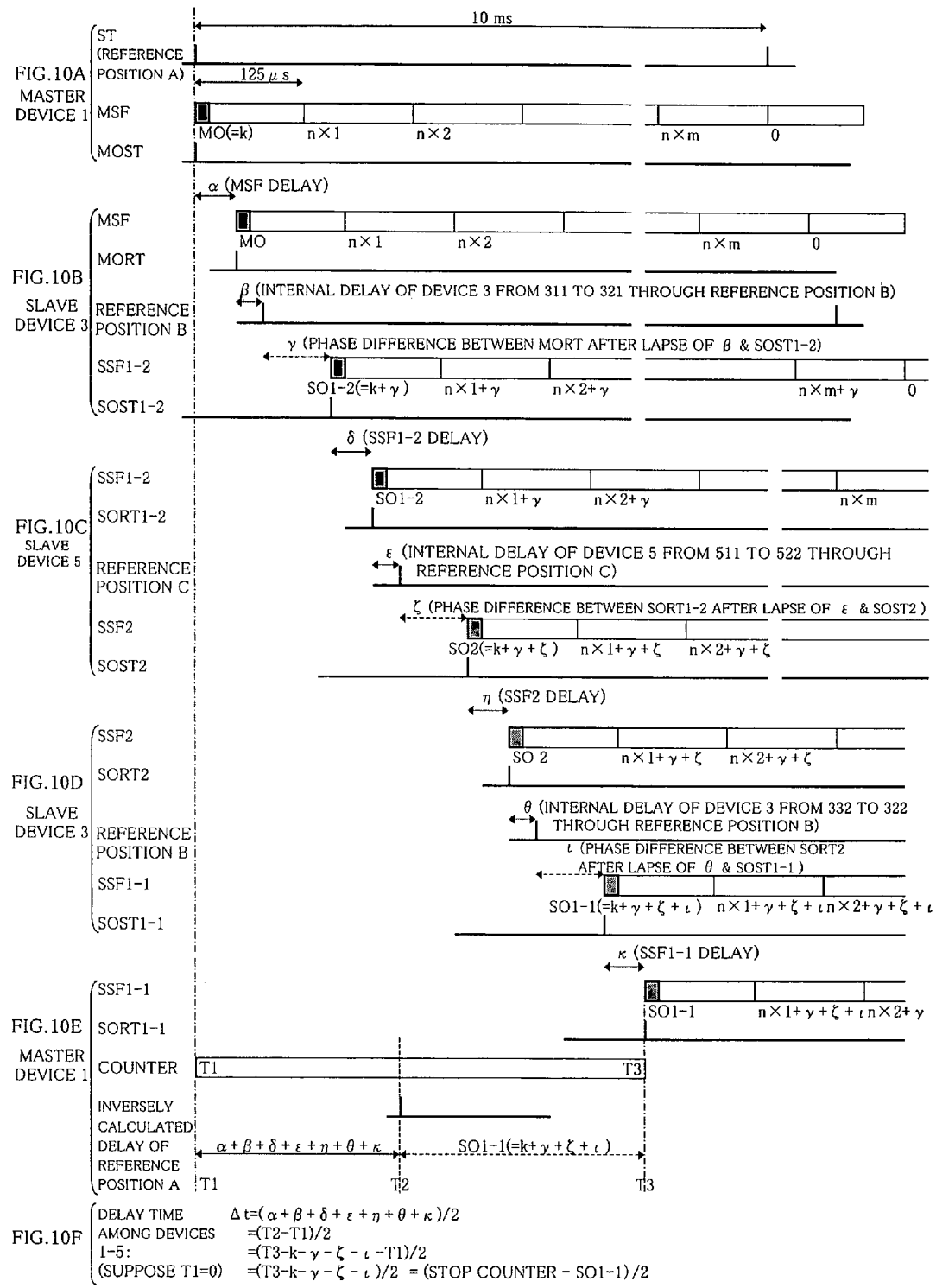

DELAY MEASUREMENT SYSTEM

BACKGROUND OF THE INVENTION

1. Field of the Invention

The present invention relates to a delay measurement system, and in particular to a delay measurement system used for a distance measurement system in a mobile telephone system such as WCDMA (Wideband Code Division Multiple Access).

2. Description of the Related Art

In a prior art distance measurement or delay time measurement (hereinafter, simply referred to as delay measurement), an arrival timing of a delay measuring command outputted from a master device which serves as a measurement source and returned by a slave device has been measured. Thus, a shuttle time between the master device and the slave device has been measured, thereby obtaining a connection distance between both devices.

As for such prior art, there is a frame synchronization device of a mobile communication system, in which base stations performing wireless communication with mobile terminals by a time division multiple access method are connected over an IP network, provided with a transfer delay time calculating means transmitting a message to each base station with the IP network and statistically calculating a response time responding to the message as a transfer delay time for each base station using the IP network, a frame synchronous control means transmitting a frame synchronous message including transfer delay time information obtained by the transfer delay time calculating means for establishing a frame synchronization between the base stations, and a frame timing generation means receiving the frame synchronous message from the frame synchronous control means and generating a frame timing by the base station based on frame synchronous information (see e.g. patent document 1).

[Patent document 1]
Japanese Patent Application Laid-open No. 2000-324535

In the above-mentioned prior art, a timing of receiving a return signal for delay measurement at a master device fluctuates according to a distance between the master device and a slave device, thereby providing an arbitrary timing.

Therefore, at the timing of receiving the return signal for delay measurement in the master device, a signal of main information or the like can not be received in order to avoid collision. Also, a connection distance between the master device and the slave device is not known at the initial time of a connection. Therefore, an estimated reception timing of the above-mentioned delay measuring return signal requires a delay measuring window width to some extent, resulting in a problem that a transmission capacity for the main information is reduced. Also, there is a problem that the longer the connection distance becomes and the higher the transmission speed becomes, the larger the ratio of the transmission capacity occupied by the delay measuring window width becomes.

Also, when a delay time is measured by assigning a delay measuring signal to free bytes of an overhead, a delay time specific to each device is not known, so that an accurate delay time can not be measured.

Also, in a system arrangement where a plurality of slave devices are connected to the master device in cascade, when the distance from the master device to each slave device is measured and when a transmission signal is regenerated and relayed between the slave devices, the regeneration and relay of the delay measuring signal are also required. However, when the timing of the delay measuring signal overlaps a timing of an overhead portion that is a fixed timing of a transmission frame, a phase fluctuation occurs at the timing of the delay measuring signal since a transfer is performed avoiding the overhead portion. Accordingly, if the phase fluctuation is accumulated by the cascade connection, such a problem that a delay measurement error becomes large has occurred.

SUMMARY OF THE INVENTION

It is accordingly an object of the present invention to provide a system performing a delay measurement between a master device and a slave device, wherein an accurate measurement is performed without requiring a delay measuring window width, and a phase fluctuation of a delay measuring signal does not occur even when a plurality of slave devices are connected to the master device in cascade.

In order to achieve the above-mentioned object, a delay measurement system according to the present invention comprises: a master device which transmits a delay measuring signal at a fixed timing relative to a synchronous pattern signal in an overhead and transmits a frame signal in which an internal delay time, associated with a frame signal generation, from a delay measurement start timing to a transmission timing of the delay measuring signal is stored in the delay measuring signal as a master offset value; and a slave device which adds an internal delay time of its own device associated with a frame signal generation to the master offset value after having received the frame signal to make a slave offset value and transmits a frame signal in which the delay measuring signal is updated with the slave offset value; the master device calculating a delay time between both devices by subtracting the slave offset value from a time difference between a timing at which the delay measuring signal within the frame signal transmitted from the slave device is received and the delay measurement start timing.

Namely, in the present invention, a delay measuring signal is multiplexed into an overhead portion which is at a fixed timing of a transmission frame signal to be transmitted/received, independently of a synchronous pattern signal. In a payload portion which is at another fixed timing, main information or the like is multiplexed to be transmitted/received.

A timing of receiving the delay measuring signal in the slave device and a timing of transmitting the delay measuring signal when the signal is transferred from the master device to the slave device, from the slave device to the slave device, or from the slave device to the master device are arbitrary timings independent of each other. Therefore, an internal delay time specific to each device when the frame signal is generated and transmitted (at the time of frame changeover) is embedded as a virtual time in the delay measuring signal of the overhead.

The master device subtracts the virtual time within the delay measuring signal from a time difference between a timing of transmitting the delay measuring signal by its own device and a timing of receiving the overhead into which the delay measuring signal received from the slave device is multiplexed. Thus, the delay time between the master device and the slave device can be measured, and a connection distance can be obtained.

The delay measurement system of the present invention will now be described referring to FIG. 1.

Case of One-to-One Connection Between Master Device and Slave Device:

A master device 1 is connected to a slave device 3 through e.g. a single-core bidirectional transmission line 2. In the master device 1, e.g. a delay controller 11 and an interface 12 are provided. The delay controller 11 has e.g. a signal generator 110, which provides e.g. a reference position A which generates the delay measuring signal. Also in the slave device 3, e.g. an interface 31 and a delay controller 32 are provided. In the delay controller 32, e.g. a signal loopback portion 320 provides a reference position B. Delay measurement is performed for a delay measurement section A-B between the reference position A of the master device 1 and the reference position B of the slave device 3.

Firstly, in the master device 1, the synchronous pattern signal and the delay measuring signal are set in the overhead of the frame signal. The delay measuring signal in this case is set at a relatively fixed timing different from that of the synchronous pattern signal. The delay controller 11 generates a delay measurement start timing at the reference position A in the signal generator 110 to start a delay measurement. The internal delay time specific to the master device 1 from the delay measurement start timing to the frame signal timing of transmitting the delay measuring signal from the interface 12 to the slave device 3 is stored in the delay measuring signal as a master offset value. The frame signal in which the delay measuring signal is stored is transmitted to the slave device 3 through a downstream 21 in the transmission line 2.

When the slave device 3 receives the frame signal from the downstream 21, in the example of FIG. 1, the internal delay time of the slave device 3 itself from the timing of loopback to the interface 31 again through the interface 31 and the reference position B of the delay controller 32 to the timing of transmitting the frame signal to an upstream 22 associated with the generation of the frame signal is added to the above-mentioned master offset value to be stored in the delay measuring signal as a slave offset value. Then, the frame signal is sent back to the master device 1.

Namely, the delay time when the signal is transmitted within the slave device 3 is included in a delay time that is desired to be obtained finally. Therefore, the above-mentioned slave offset value does not include the internal delay time, but includes the delay time from the timing when the master offset value substantially loops back within the slave device after the slave device has received the master offset value within the delay measuring signal to the transmission timing of the delay measuring signal within the frame signal generated by the slave device.

More specifically, when the frame signal is received from the master device 1 at the interface 31 in the slave device 3, and the frame signal is looped back to the interface 31 through the reference position B, the delay time required for the loopback is firstly included. However, this delay time is a time required for the delay measurement section A-B. The frame signal of the slave device 3 itself is generated and outputted from the interface 31. However, since the frame signal looped back through the reference position B is not outputted unchanged, the delay time (delay time associated with the frame signal generation) from the timing of the master offset value looped back to the transmission timing of the delay measuring signal within the frame signal generated by the interface of the slave device is generated at the interface 31. This delay time is made the slave offset value.

When receiving the frame signal transmitted from the slave device 3 through the upstream 22, the master device 1 determines the time difference between the reception timing of the slave offset value within the frame signal and the above-mentioned delay measurement start timing at the delay controller 11, and subtracts the slave offset value stored in the delay measuring signal within the frame signal from the time difference. Thus, it becomes possible to calculate the transmission delay time between the master device 1 and the slave device 3, and to obtain the connection distance between both devices based on the delay time.

When the delay measurement start timing is generated at the master device 1 in this way, the specific internal delay time exists from the delay measurement start timing to the timing of actually transmitting the delay measuring signal carried on the frame signal to the transmission line 2 from the interface 12. Also, in the slave device 3, the internal delay time (delay time specific to the device, having nothing to do with the transmission delay) associated with the frame signal transmission of the slave device itself exists from the time when the delay measuring signal of the frame signal is received at the interface 31 to the time when the signal is sent back again from the interface 31 after looping back at the reference position B. It is indicated that if these internal delay times are subtracted from the entire difference time, the delay time between both devices can be calculated.

Case Where a Plurality of Slave Devices are Connected to Master Device in Cascade:

Although FIG. 1 shows a one-to-one connection case between a master device 1 and a slave device 3, the present invention can be applied to the case where a plurality of slave devices (two in this example) are connected in cascade as shown in FIG. 2.

In this case, when a plurality of slave devices are connected in cascade, one slave device may add the internal delay time of its own device associated with the frame signal generation to the offset value from the master, device or the slave device at the preceding stage to make the slave offset value of its own device and may transmit a frame signal in which the delay measuring signal is updated with the slave offset value to the slave device at the subsequent stage or the preceding stage.

Namely, in an operation form in which the slave devices are connected in cascade, a time difference between the position of the overhead into which the delay measuring signal received by the slave device is multiplexed and the position of the overhead into which the delay measuring signal transferred and transmitted by the slave device is multiplexed, i.e. the specific internal delay time required for the frame signal generation/transmission in each slave device is added to the virtual time within the delay measuring signal to be transferred, thereby enabling a similar delay measurement.

This operation will now be described referring to FIG. 2. The slave device 3 is further connected to a slave device 5 through e.g. a single-core bidirectional transmission line 4. In this example, the frame signal from the master device 1 is looped back through a reference position C of a signal loopback portion 520 in e.g. a delay controller 52 in the slave device 5. Accordingly, the slave device 3 adds the internal delay time of the slave device 3 itself associated with the frame signal generation to the master offset value from the master device 1 to make or form the slave offset value of its own device, and transmits the slave offset value to the slave device 5 through a downstream 41 from an interface 33.

The slave device 5 also adds the internal delay time of the slave device 5 itself associated with the frame signal generation to the slave offset value from the slave device 3 at the preceding stage to make or form the slave offset value of its own device. The slave offset value is stored in the delay measuring signal, and the frame signal including the delay measuring signal is transmitted to the slave device 3.

The slave device 3 adds its own internal delay time associated with the frame signal generation to the offset value from the slave device 5 at the preceding stage to make or form the slave offset value of its own device. The frame signal in which the slave offset value is stored in the delay measuring signal is transmitted to the master device 1.

Namely, the internal delay time of the slave device may comprise a delay time until a transmission timing of the delay measuring signal within the frame signal generated by the slave device after the slave device has received the master offset value or the slave offset value within the delay measuring signal.

Thus, even when a plurality of slave devices are connected in cascade, the internal delay time associated with the frame signal transmission in each device is accumulated in the delay measuring signal. By subtracting the accumulated internal delay time from the time difference between the delay measurement start timing to the timing when the frame signal has returned, the delay time of the delay measurement section A-C between the master device 1 and the slave device 5 can be calculated in the same way as the above-mentioned one-to-one connection case.

Also, the slave device may be provided with, by extracting an object device address set within the frame signal, a selector (not shown in FIG. 2 but will be described later) which selects either a loopback mode or a through mode. Thus, in the example of FIG. 2, the selector in e.g. the delay controller 32 of the slave device 3 selects the through mode, and the selector in e.g. the delay controller 52 of the slave device 5 determines that its own device is in the loopback mode to select a mode, whereby the delay time to the desired slave device can be automatically measured.

Also, the above-mentioned delay measuring signal may store the offset value only at a setting timing in the overhead within the first frame signal. Thus, the delay measurement can be limited at e.g. an operation start time, and an influence during operation can be eliminated.

Alternatively, the delay measuring signal may store the above-mentioned offset value at the setting timing in an overhead within a plurality of frame signals. Thus, the delay measurement can be performed during operation and delay value fluctuations during operation can be monitored.

Furthermore, the master device may transfer the calculated delay time to each slave device. Thus, it becomes possible to transfer a delay adjustment value to each slave device based on a calculation result of the delay measurement, and to adjust the delay time in each slave device.

Furthermore, frame signals generated by the master device and slave device may have the same format. Thus, the arrangements of offset generation can be made the same.

Also, in the present invention, a master device transmitting a delay measuring signal at a fixed timing relative to a synchronous pattern signal in an overhead is provided.

Furthermore, in the present invention, a slave device is provided, which transmits a frame signal which is the delay measuring signal updated with an internal delay time of its own device associated with a frame signal generation, after having received the frame signal into which a delay measuring signal is inserted at a fixed timing relative to a synchronous pattern signal in an overhead.

As described above, in the present invention, the delay measuring signal is set in the overhead at a fixed timing different from that of the synchronous pattern in the transmission frame signal to be transmitted/received, whereby the delay measurement is performed by storing the internal delay time of the master device associated with the frame signal generation and the internal delay time of the slave device associated with the frame signal generation in the delay measuring signal and looping back the signal. Therefore, the accurate delay measurement can be achieved without reducing the transmission capacity of main information. In this case, it is advantageous that any restriction on the connection distance and the transmission rate is eliminated. Also, in the operation form of the cascade connection, the delay measurement can be performed without depending on the number of devices connected, and accumulation of delay measurement errors can be suppressed.

Furthermore, since the delay measurement is achieved with the delay measuring signal, the delay measurement during operation and monitoring are made possible. Also, upon cascade connection, there is an effect that the delay measurement during operation is made possible when additional slave devices are installed.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which:

FIGS. 6A–6D are operation time charts of an embodiment upon one-to-one connection in a delay measurement system according to the present invention;

FIGS. 7A and 7B are time charts for illustrating a generation procedure of an offset value used in an embodiment upon one-to-one connection in a delay measurement system according to the present invention;

FIG. 9 is a block diagram showing an embodiment of a slave device (right end position) when a delay measurement system according to the present invention is used in a cascade connection; and FIGS. 10A–10F are operation time charts of an embodiment upon cascade connection in a delay measurement system according to the present invention.

DESCRIPTION OF THE EMBODIMENTS

Figure 1:
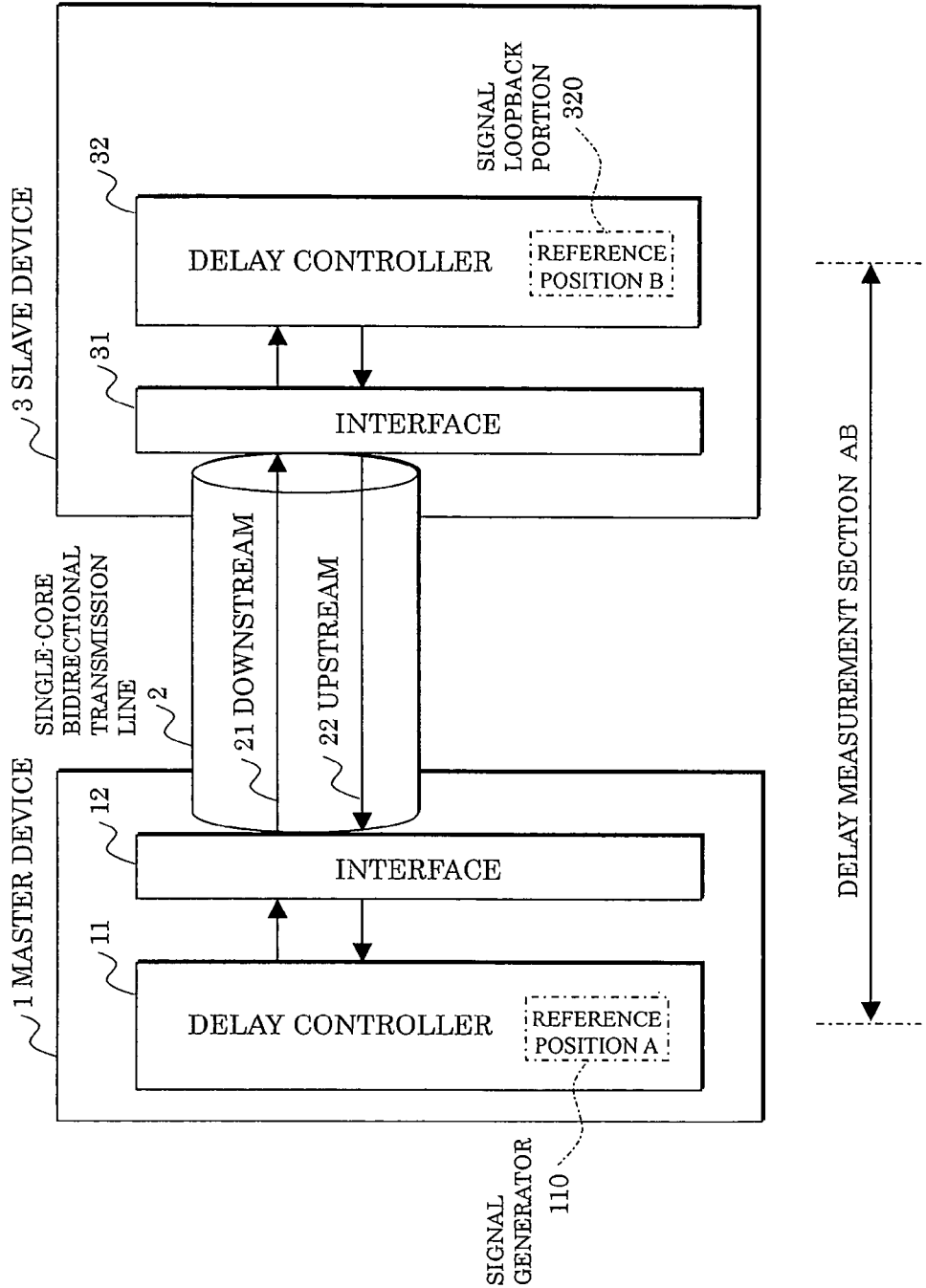
FIG. 1 is a block diagram showing a principle diagram (in case of one-to-one connection of a master device and a slave device) of a delay measurement system according to the present invention.
Figure 2:
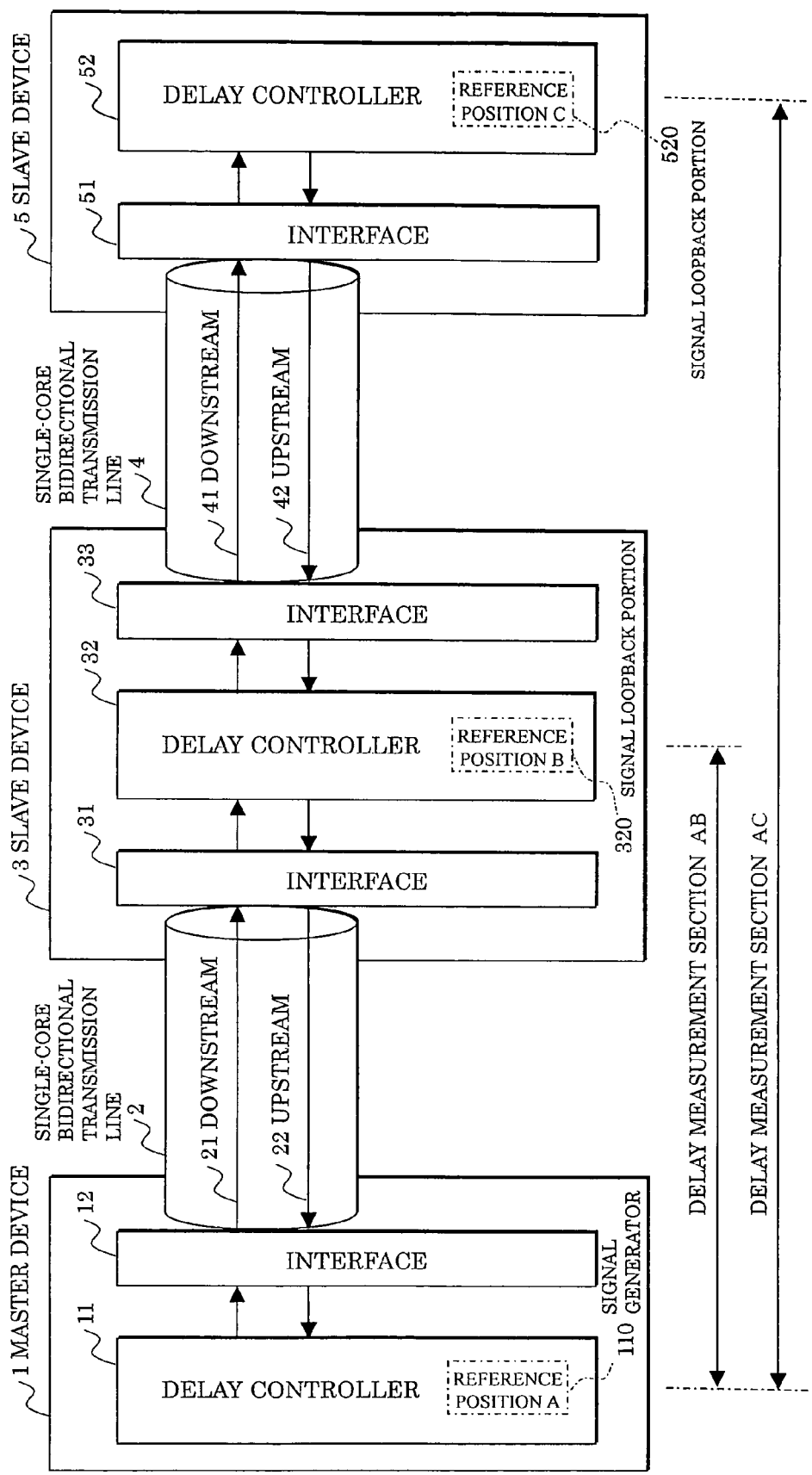
FIG. 2 is a block diagram showing a principle diagram (in case a plurality of slave devices are connected to a master device in cascade) of a delay measurement system according to the present invention.
Figure 3:
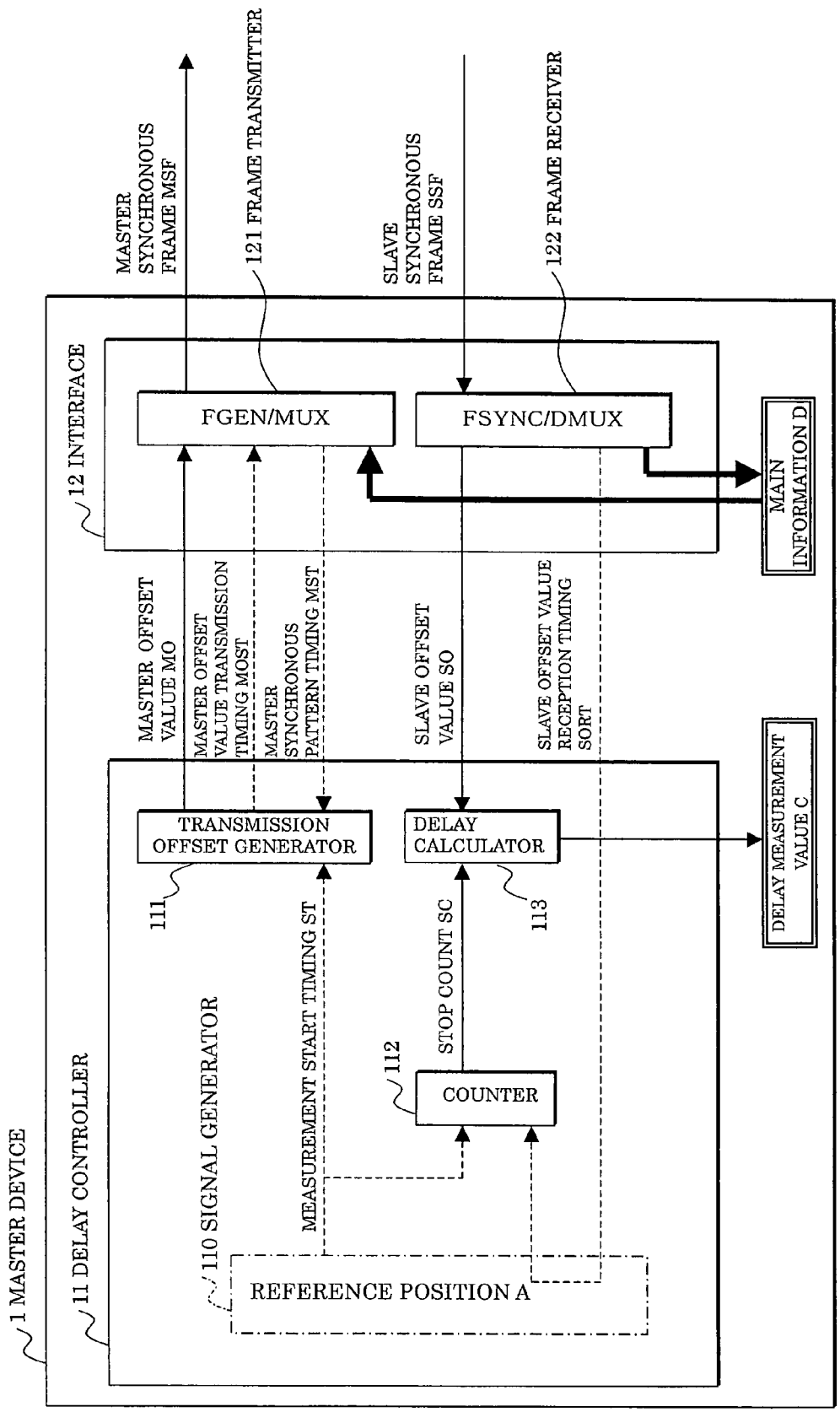
FIG. 3 is a block diagram showing an embodiment of a master device used for a delay measurement system according to the present invention.

FIG. 3 shows an embodiment of the master device 1 in the principle diagram of the present invention shown in FIGS. 1 and 2. In this embodiment, as shown in FIGS. 1 and 2, the master device 1 is provided with the delay controller 11 and the interface 12. The delay controller 11 is further provided with the signal generator 110, a transmission offset generator 111, a counter 112, and a delay calculator 113. The interface 12 is provided with a frame transmitter (FGEN/MUX) 121 and a frame receiver (FSYNC/DMUX) 122.

A measurement start timing ST is provided to the transmission offset generator 111 and the counter 112 from the signal generator 110 located at the reference position A. A master synchronous pattern timing MST is provided to the transmission offset generator 111 from the frame transmitter 121 of the interface 12, whereby a master offset value transmission timing MOST is provided to the frame transmitter 121 and a master offset value MO is provided to the frame transmitter 121. A master synchronous frame MSF in which main information D is stored in the payload and the master offset value is stored in the delay measuring signal at the master offset value transmission timing MOST is transmitted to the downstream 21 from the frame transmitter 121.

Also, a slave synchronous frame SSF from the upstream 22 is received by the frame receiver 122, the main information D within the frame is taken out by the frame receiver 122 and a slave offset value SO is provided to the delay calculator 113. Furthermore, a slave offset value reception timing SORT is generated and provided to the counter 122 through the reference position A. At this time, a stop count SC is provided to the delay calculator 113 from the counter 122, whereby a delay measurement value C can be determined by the difference between the stop count SC and the slave offset value SO.

Figure 4:
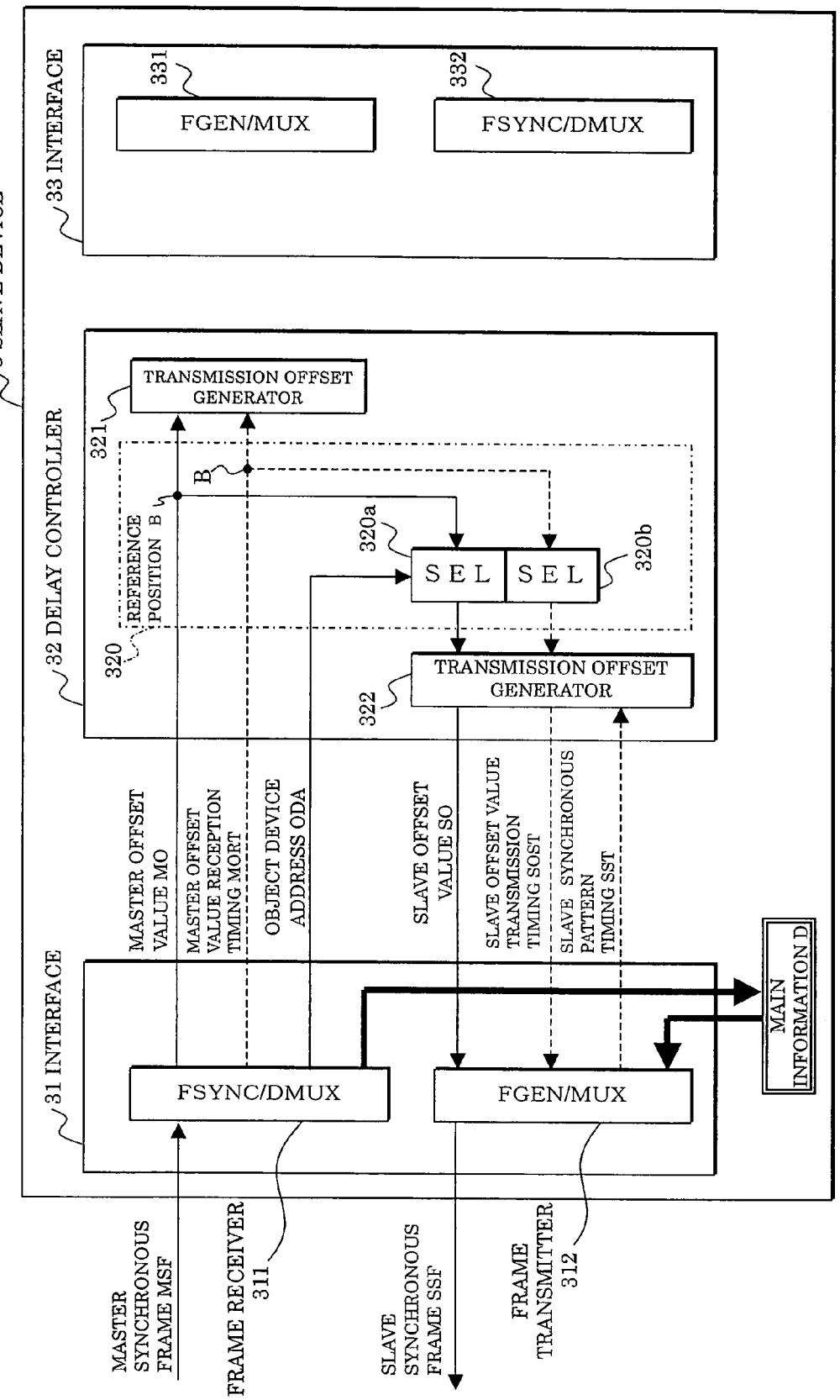
FIG. 4 is a block diagram showing an embodiment of a slave device used in case of one-to-one connection in a delay measurement system according to the present invention.

Embodiment of One-to-One Connection of Master Device and Slave Device: FIG. 4

FIG. 4 shows an embodiment of the slave device, and in particular an embodiment of the slave device in case of one-to-one connection between the master device and the slave device corresponding to the slave device 3 in the principle diagram shown in FIG. 1. This embodiment includes the interface 31 and the delay controller 32, as shown in FIG. 1, as well as an interface 33. However, since a subsequent slave device is not connected to the slave device 3 as shown in FIG. 1 in this embodiment, no signal is provided to the interface 33 from the delay controller 32. Hence, the interface 33 is not shown in FIG. 1.

The interface 31 is provided with a frame receiver (FSYNC/DMUX) 311 and a frame transmitter (FGEN/MUX) 312. The delay controller 32 includes transmission offset generators 321 and 322 in addition to a signal loopback portion 320 including the reference position B. Also, the signal loopback portion 320 is provided with selectors 320a and 320b. It is to be noted that the interface 33 has a frame transmitter 331 and a frame receiver 332 in the same way as the interface 31.

In this arrangement, the frame receiver 311 of the interface 31 receives the master synchronous frame MSF from the master device 1, demultiplexes the main information D within the master synchronous frame, and extracts an object device address ODA set in a predetermined byte position within the frame signal to be provided to the selectors 320a and 320b, thereby performing the switching control of these selectors 320a and 320b. Also, the master offset value MO is outputted from the frame receiver 311 at the master offset value reception timing MORT, and is transmitted to the selector 320a through the reference position B in the signal loopback portion 320. The master offset value MO is also transmitted to the transmission offset generator 321 at the same time. Also, the master offset value reception timing MORT is provided to the selector 320b through the reference position B from the frame receiver 311, and is also provided to the transmission offset generator 321 at the same time.

When receiving the object device address ODA from the frame receiver 311, the selectors 320a and 320b determine whether or not the master synchronous frame is addressed to their own device. Since no subsequent slave device is connected to the slave device 3 in this example, the selectors determine that the frame is addressed to their own device. The selector 320a provides the master offset value MO to the transmission offset generator 322, and the selector 320b provides the master offset value reception timing MORT to the transmission offset generator 322. A slave synchronous pattern timing SST is provided to the transmission offset generator 322 from the frame transmitter 312, whereby the slave offset value SO is transmitted to the frame transmitter 312 at a slave offset value transmission timing SOST in the same way as the relationship between the transmission offset generator 111 and the frame transmitter 121 in the master device 1 shown in FIG. 3. The frame transmitter 312 inserts the main information D into the payload, and sends back to the master device 1 the slave synchronous frame SSF in which the slave offset value SO is set at the slave offset value transmission timing SOST.

Figure 5A:
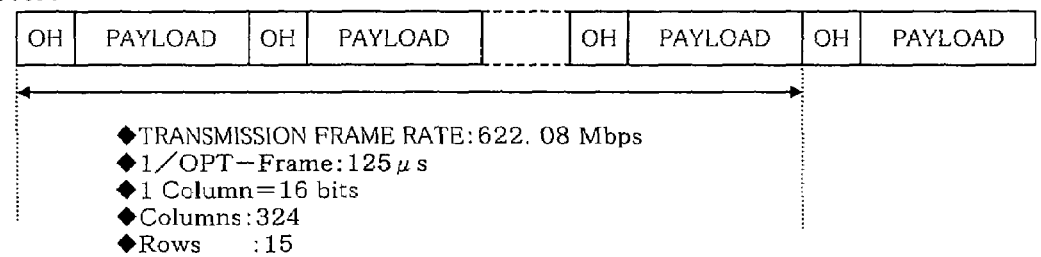
FIGS. 5A and 5B are format diagrams of a frame used for a delay measurement system according to the present invention.
Figure 5B:
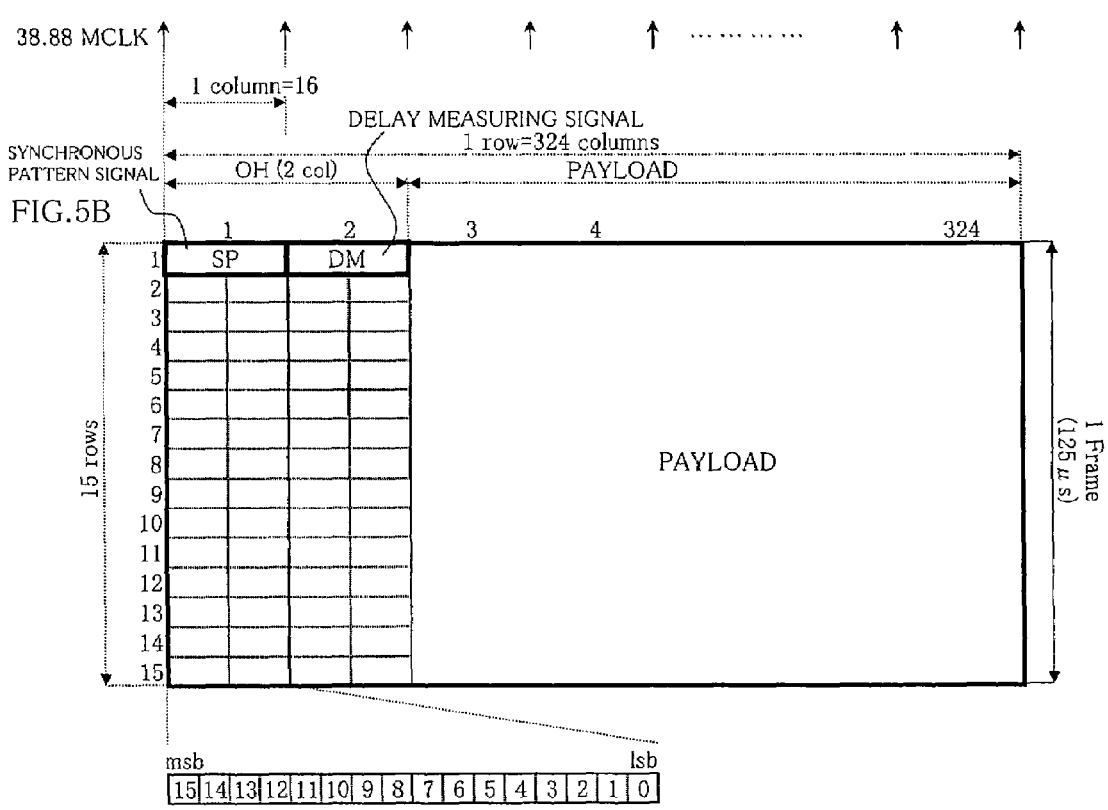

Frame format: FIGS. 5A and 5B

FIGS. 5A and 5B show a frame format used as the master synchronous frame MSF and the slave synchronous frame SSF shown in FIGS. 3 and 4. This frame format is a transformed one used for an SDH frame and an SONET frame. An overhead portion OH is composed of 4 bytes×15, and the payload storing the main information D is composed of 322×2 bytes×15. The transmission frame is 125 μs and its rate is 622.08 Mbps. Only a row 1 and a column 1 are assigned to the synchronous pattern signal SP, and a column 2 of the row 1 is assigned to the delay measuring signal DM. The above-mentioned offset values are stored in the delay measuring signal DM.

It is to be noted that the synchronous pattern signal SP and the delay measuring signal DM may be set to any portion as long as the position is relatively fixed in the overhead portion OH.

Also, this frame format need not always be the same for each device if the reception side device can specify it. However, if the same format is used, the arrangement of each offset generator can be made the same.

Operation Examples FIGS. 6A–6D and FIGS. 7A and 7B

An operation example in the one-to-one connection case of the master device and the slave device shown in FIGS. 3 and 4 will now be described referring to FIGS. 6A–6D and FIGS. 7A and 7B. It is to be noted that the synchronous pattern signal SP is omitted for simplification purpose of figure and the delay measuring signal DM is simply shown so as to locate at a top of the frame signal in FIGS. 6A–6D.

Firstly, the signal generator 110 at the reference position A of the delay controller 11 in the master device 1 generates the measurement start timing ST as shown in FIGS. 6A and 7A to be transmitted to the counter 112 and the transmission offset generator 111 at the same time. Thus, the counter 112 starts counting of the delay measurement time.

When the measurement start timing ST is received at the transmission offset generator 111, an internal counter (not shown) starts counting from at a time C1 of FIG. 7A.

On the other hand, the frame transmitter 121 generates the master synchronous frame MSF as shown in FIGS. 6A and 7A, stores the main information D in the payload to be transmitted to the downstream 21. When the synchronous pattern signal SP is set as shown in FIG. 5B, the master synchronous pattern timing MST is transmitted to the transmission offset generator 111. The transmission offset generator 111 preliminarily recognizes the relative relationship (see FIG. 5B) between the synchronous pattern signal SP and the delay measuring signal DM. When the transmission offset generator 111 receives the master synchronous pattern timing MST from the frame transmitter 121, the delay measuring signal DM is adjacent to the synchronous pattern signal SP in the example of FIG. 5B, so that the master offset value transmission timing MOST is generated as shown in FIGS. 6A and 7A at the timing of setting the delay measuring signal DM (time from the measurement start timing to the transmission timing).

When the delay measuring signal DM is set in the frame signal, the internal counter stops a count operation at a time C2, and a count "k" at this time is stored in the delay measuring signal DM as the master offset value MO=k to be transmitted to the frame transmitter 121. Accordingly, the frame transmitter 121 transmits to the slave device 3 the master synchronous frame MSF in which the master offset value MO=k is stored in the delay measuring signal DM shown in FIG. 5B.

When the frame receiver 311 of the interface 31 in the slave device 3 shown in FIG. 4 receives the master synchronous frame MSF after a time "α" elapses from the master offset value transmission timing MOST as shown in FIG. 6B, the frame receiver 311 firstly takes out the main information D in the payload, and extracts the object device address ODA to be transmitted to the selectors 320a and 320b.

As mentioned above, a destination address (not shown) of the slave device which forms an object of the delay measurement is set in a predetermined position of the overhead of the master synchronous frame MSF. The selectors 320a and 320b receive this object device address ODA, and determine whether or not the master synchronous frame is addressed to their own device. When the master synchronous frame is addressed to their own device, the loopback mode is selected. When it is addressed to another slave device, the through mode is selected. Since this example treats the one-to-one connection of the master device 1 and the slave device 3, the selectors 320a and 320b determine that the master synchronous frame is addressed to their own device to select the loopback mode.

Also, the frame receiver 311 detects the synchronous pattern signal SP in the master synchronous frame MSF as shown in FIG. 7B, thereby internally generating the master synchronous pattern timing MST. Since the frame receiver 311 preliminarily recognizes that the delay measuring signal DM storing the master offset value therein is set subsequent to the master synchronous pattern timing MST, the master offset value reception timing MORT is outputted as a timing subsequent to the master synchronous pattern timing MST, and is transmitted to the selector 320b through the reference position B of the signal loopback portion 320.

The selector 320b is set to the loopback mode at this time as mentioned above, the master offset value reception timing MORT is provided to the transmission offset generator 322 unchanged. Also, the frame receiver 311 takes out the master offset value MO from the delay measuring signal DM by the master offset value reception timing MORT to be provided similarly to the transmission offset generator 322 through the selector 320a from the reference position B of the signal loopback portion 320. A loopback delay time when the master offset value reception timing MORT reaches the transmission offset generator 322 from the frame receiver 311 through the reference position B is indicated as an internal delay time "β" in FIGS. 6B and 7B.

The transmission offset generator 322 having received the master offset value reception timing MORT and the master offset value MO after the internal delay time β delay in this way performs the same operation as the transmission offset generator 111 of FIG. 3. However, FIG. 7B shows that the measurement start timing ST provided to the transmission offset generator 111 corresponds to a timing MORT' which is later than the master offset value reception timing MORT by β.

Namely, when the transmission offset generator 322 receives the master offset value reception timing MORT, the internal counter (not shown) starts counting. Then, the slave synchronous pattern timing SST is received from the frame transmitter 312, whereby the position of the delay measuring signal DM is recognized. Since the delay measuring signal DM is adjacent to the slave synchronous pattern timing SST in this example, the slave offset value transmission timing SOST is generated to be transmitted to the frame transmitter 312. Also, the slave offset value SO=k+γ in which the count "γ" at this time is further added to the master offset value MO stored in the delay measuring signal DM at the timing position is transmitted to the frame transmitter 312.

When receiving the slave offset value SO, the frame transmitter 312 stores the main information D in the payload, stores the slave offset value SO=k+γ in the delay measuring signal DM in the slave offset value transmission timing SOST, and generates the slave synchronous frame SSF to be looped back to the master device 1.

It is to be noted that the count γ in the transmission offset generator 322 indicates a phase difference between the master offset value reception timing (transmission start timing) MORT' after the lapse of the delay time β and the slave offset value transmission timing SOST. Namely, it is indicated that the delay time β due to the loopback of its own device and the delay time γ when the slave synchronous frame SSF of its own device is generated (upon frame changeover) exist as an operation delay in the slave device 3. The delay time SO=k+γ only using the delay time γ of the internal delay time is stored in the delay measuring signal DM to be transmitted to the master device as the slave synchronous frame SSF.

When receiving the slave synchronous frame SSF from the frame transmitter 312 after a time δ as shown in FIG. 6C in the master device 1, the frame receiver 122 takes out the main information D in the payload, and extracts the slave offset value reception timing SORT to be provided to the counter 112 through the reference position A. By this operation, the counter 112 stops the operation, and the count SC at this time is provided to the delay calculator 113. Also, since the frame receiver 122 transmits the slave offset value SO at the timing of the slave offset value reception timing SORT to the delay calculator 113, it performs the subtraction of "SC−SO" to output a delay measurement C.

Namely, as for the delay time between the master device 1 and the slave device 3, since the delay time only by the signal transmission has to be obtained as shown in FIGS. 6C and 6D, $\Delta t=(\alpha+\beta+\delta)/2$. However, in the time difference (T3−T1) from the transmission of the master synchronous frame MSF to the reception of the slave synchronous frame SSF, only the master offset value MO=k in the master device 1, and the phase difference γ between the transmission start timing MORT' after the lapse of the delay time β and the SOST are recognized. Therefore, the delay time Δt can be obtained if SO=k+γ is subtracted from the time difference (T3−T1). Accordingly, the subtraction between the stop count SC and the slave offset value SO is performed in the delay calculator 113, the delay measurement C can be obtained.

Figure 8:
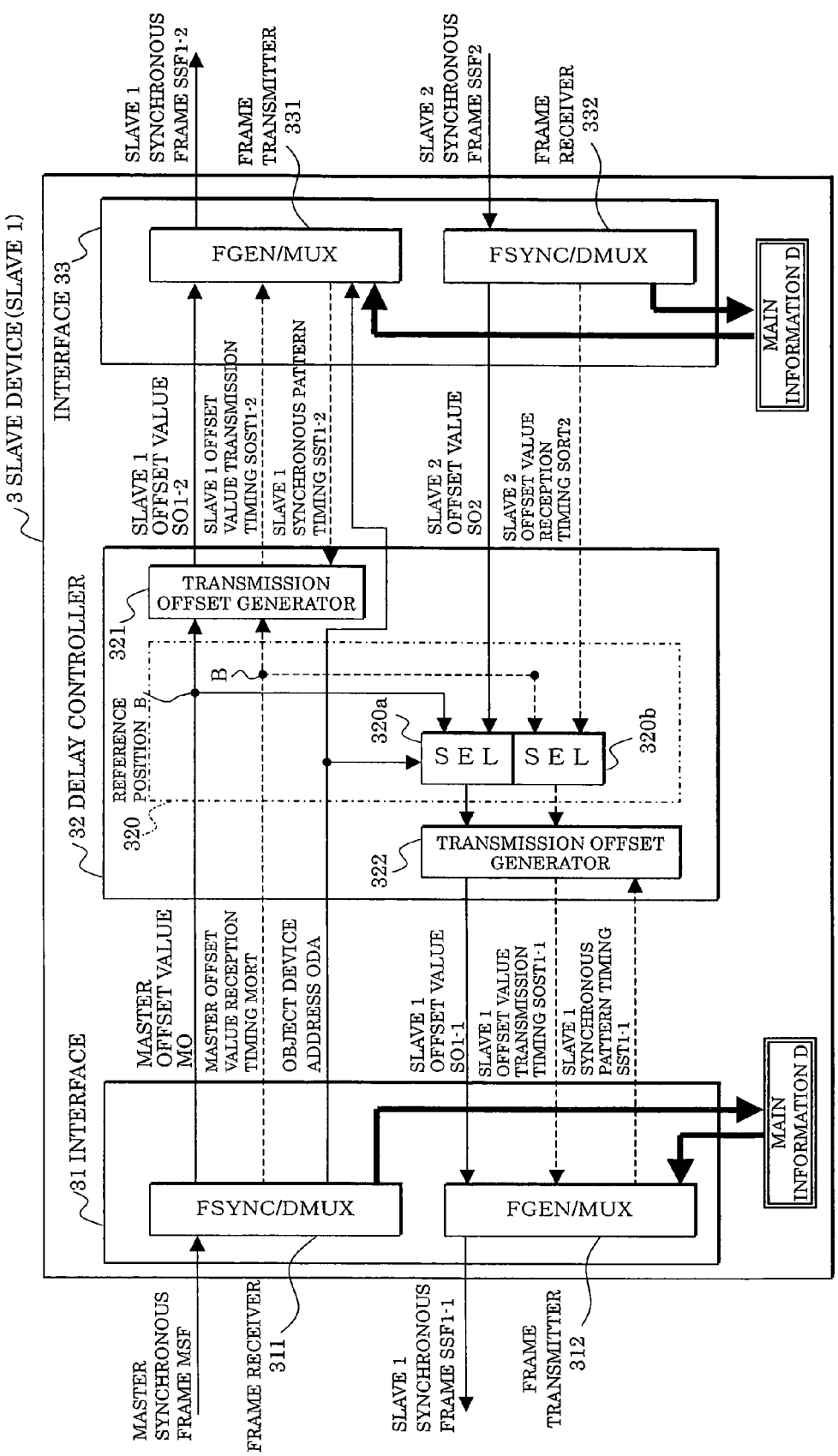
FIG. 8 is a block diagram showing an embodiment of a slave device (middle position) when a delay measurement system according to the present invention is used in a cascade connection.

Embodiment When a Plurality of Slave Devices are Connected to the Master Device in Cascade FIG. 8 shows an embodiment of the slave device 3 (slave 1) used in the principle diagram of the present invention shown in FIG. 2. As mentioned above, the slave devices respectively have the common arrangement. However, the embodiment of FIG. 8 is different from that of FIG. 4 in that the interface 33 operates synchronously in addition to the interface 31 and the delay controller 32 since the slave device 3 is set in the middle of the cascade connection. Accordingly, operations different from the embodiment of the slave device 3 shown in FIG. 4 will now be mainly described.

The slave device of FIG. 8 is different from that of FIG. 4 in that the object device address ODA is transmitted to not only the selectors 320a and 320b but also the frame transmitter 331 from the frame receiver 311. Also, it is different in that the transmission offset generator 321 of the delay controller 32 receives a slave 1 synchronous pattern timing SST1-2 from the frame transmitter 331, and transmits a slave 1 offset value transmission timing SOST1-2 and a slave 1 offset value SO1-2 to the frame transmitter 331. Also, it is different in that a slave 2 offset value SO2 is transmitted to the selector 320a from the frame receiver 332, and a slave 2 offset value reception timing SORT2 is transmitted to the selector 320b. It is to be noted that since the object device address in this case does not make the slave device 3 an object of the delay measurement, the selectors 320a and 320b are set to the through mode.

Also, the synchronous pattern timing from the frame transmitter 312 to the transmission offset generator 322 is referred to as a slave 1 synchronous pattern timing SST1-1, the transmission timing from the transmission offset generator 322 to the frame transmitter 312 is referred to as a slave 1 offset value transmission timing SOST1-1, and the offset value is further referred to as a slave 1 offset value SO1-1. Similarly, the synchronous frame from the frame transmitter 312 to the master device 1 is referred to as a slave 1 synchronous frame SSF1-1, and the synchronous frame transmitted to the downstream 41 from the frame transmitter 331 is referred to as a slave 1 synchronous frame SSF1-2. It is to be noted that a slave 2 synchronous frame SSF2 indicates the synchronous frame from the slave device 5 shown in FIG. 9.

FIG. 9 shows an embodiment of the slave device 5 (slave 2) at the right end of the principle diagram of the present invention shown in FIG. 2. This embodiment has the same arrangement as the embodiment of each slave device. However, since this slave device is located at the right end of the cascade connection, the slave device is basically the same as the slave device 3 in the loopback mode in case of the one-to-one connection shown in FIG. 4. In order to simplify the figure, the transmission offset generator and the selectors are omitted in the delay controller 52. However, as shown in FIG. 9, since the slave device 5 is connected to the slave device 3 through the transmission line 4, the synchronous frame received is the slave 1 synchronous frame SSF1-2, the object device address ODA is outputted from the frame receiver 511, the offset value reception timing is the slave 1 offset value reception timing SORT1-2, and the offset value is the slave 1 offset value SO1-2. The object device address ODA in this case makes the slave device 5 the delay measurement object.

Furthermore, the synchronous pattern timing to the transmission offset generator 522 is a slave 2 synchronous pattern timing SST2, the offset value transmission timing outputted from the transmission offset generator 522 is referred to as a slave 2 offset value transmission timing SOST2, and the offset value is a slave 2 offset value SO2.

Operation Example: FIGS. 10A–10F

FIGS. 10A–10F show delay measurement time charts between the master device 1 and the slave devices 3 and 5 connected in cascade. In these time charts, the signals of FIGS. 10A and 10B are the same as FIGS. 6A and 6B except their names. However in FIGS. 10A and 10B, the time charts are for transmitting the signal to the slave device 5 not from the transmission offset generator 322 but from the transmission offset generator 321 through the interface 33, which is different from FIGS. 6A and 6B.

Namely, the transmission offset generator 321 performs the same operation as the transmission offset generator 322 with the master offset value reception timing MORT as a trigger. Accordingly, since the frame signal of the slave device 3 itself is generated from the frame transmission 331, the transmission offset generator 321 receives the slave 1 synchronous pattern timing SST1-2, thereby transmitting the slave 1 offset value transmission timing SOST1-2 and the slave 1 offset value SO1-2 to the frame transmitter 331. As a result, the frame transmitter 331 transmits the slave 1 synchronous frame SSF1-2.

Also, the internal delay time β shown in FIG. 10B indicates the internal signal transmission time from the frame receiver 311 to the transmission offset generator 321 through the reference position B.

Thus, the slave device 3 transmits the delay measuring signal DM within the slave 1 synchronous frame SSF1-2 in which "k+γ" is set to the slave 1 offset value SO1-2.

In the slave device 5 in which the frame receiver 511 of the interface 51 has received the slave 1 synchronous frame SSF1-2, a delay time δ due to the frame SSF1-2 as shown in FIG. 10C is generated. The object device address ODA within the slave 1 synchronous frame SSF1-2 is transmitted to the signal loopback portion 520 of the delay controller 52, and controls the selectors (not shown) the same as the selectors 320a and 320b in FIG. 8 to the loopback mode. Thus, the frame 1 offset value reception timing SORT1-2 and the slave 1 offset value SO1-2 extracted by the frame receiver 511 are looped back to the transmission offset generator 522 through the reference position C. At this time, the reception timing SORT1-2 and the offset value SO1-2 are accompanied by an internal signal transmission delay time "ε" as shown in FIG. 10C.

The slave 2 synchronous frame SSF2 is transmitted from the frame transmitter 512 to the slave device 3 through the upstream 42. The phase difference between the time when the internal delay time ε elapses and the time when the slave 2 synchronous frame SSF2 is transmitted, i.e. between the time when the slave 1 offset value reception timing SORT1-2 is provided to the transmission offset generator 522 and the time when the slave 2 offset value transmission timing SOST2 is provided to the frame transmitter 512 assumes a time "ζ" as shown in FIG. 10C.

Accordingly, this time ζ is added to the slave 1 offset value SO1-2 (k+γ) in the transmission offset generator 522 and the resultant slave 2 offset value SO2=k+γ+ζ is stored in the delay measuring signal. It is to be noted that although the slave devices are manufactured to have the same arrangement, a reference numeral different from the time γ of FIG. 10B is used for the time ζ. This is because the slave 1 synchronous pattern timing SST1-2 timing provided to e.g. the transmission offset generator 321 from the frame transmitter 331, and the frame 2 synchronous pattern timing SST2 provided to the transmission offset generator 522 from the frame transmitter 512 may be independent in each slave device.

Thus, if the slave 2 synchronous frame SSF2 transmitted from the slave device 5 is transmitted to the slave device 3 after a lapse of a time "η" as shown in FIG. 10D, the frame receiver 332 takes out the main information D from the payload, and takes out the slave 2 offset value SO2 at the slave 2 offset value reception timing SORT2 to be respectively provided to the selectors 320a and 320b. Since this slave device 3 has been already set to the through mode at this time as mentioned above, they pass through the selectors 320a and 320b to be provided to the transmission offset generator 322 respectively. In this case, the internal signal transmission delay time from the frame receiver 332 to the transmission offset generator 322 through the reference position B is supposed to be "θ" as shown in FIG. 10D.

When receiving the slave 1 synchronous pattern timing SST1-1 from the frame transmitter 312, the transmission offset generator 322 transmits the slave 1 offset value SO1-1 to the frame transmitter 312 at the slave 1 offset value transmission timing SOST1-1. The specific internal delay time associated with the frame signal generation at this time is as shown in FIG. 10D "ι" This corresponds to the phase difference between the slave 2 offset value reception timing SORT2 after the lapse of the above-mentioned delay time θ and the slave 1 offset value transmission timing SOST1-1. This time ι is added to the slave 2 offset value SO2 ($k+\gamma+\zeta$) to make the slave 1 offset value SO1-1=$k+\gamma+\zeta+\iota$. Then, it is stored in the delay measuring signal DM within the slave 1 synchronous frame SSF1-1 to be transmitted.

In the master device 1 having received the slave 1 synchronous frame SSF1-1, the frame receiver 122 detects the slave 1 offset value SO1-1 at the slave 1 offset value reception timing SORT1-1 in the same way as the embodiment shown in FIG. 3 (not shown in FIG. 3, see FIG. 10E).

The practical signal transmission delay time between the master device 1 and the slave device 5 is $\Delta t=(\alpha+\beta+\delta+\epsilon+\eta+\theta+\kappa)/2$ as shown in FIG. 10F. Since it can not be measured as it is, the slave 1 offset value SO1-1 ($k+\gamma+\zeta+\eta$) may be subtracted from the time T3−T1 from the measurement start timing ST (time T1) to the time T3 when the frame signal has returned. Therefore, by dividing "stop count SC—slave 1 offset value SO1-1" by 2, the delay time $\Delta t$ can be obtained.

It is to be noted that although the delay measuring signal is set only in the first frame in the above-mentioned embodiment, it may be set not only in the first frame but also in every frame. Thus, the fluctuation of the delay value during operation can be monitored. Also, by transferring the delay value to each slave device, it becomes possible to adjust the time delay in each slave device. Furthermore, although one or two slave devices are indicated in the above-mentioned embodiments, more slave devices can be applied in the same way.

What is claimed is:

1. A delay measurement system comprising:
    a master device including an interface which transmits a delay measuring signal at a fixed timing relative to a synchronous pattern signal in an overhead and transmits a frame signal in which an internal delay time, associated with a frame signal generation, from a delay measurement start timing to a transmission timing of the delay measuring signal is stored in the delay measuring signal as a master offset value, and a delay controller which generates the delay measuring signal; and
    a slave device including an interface which adds an internal delay time of its own device associated with a frame signal generation to the master offset value after having received the frame signal to make a slave offset value and transmits a frame signal in which the delay measuring signal is updated with the slave offset value, and a delay controller which updates the delay measuring signal; wherein
    the delay controller of the master device calculating a delay time between both devices by subtracting the slave offset value from a time difference between a timing at which the delay measuring signal within the frame signal transmitted from the slave device is received and the delay measurement start timing.

2. The delay measurement system as claimed in claim 1 wherein the internal delay time of the slave device comprises a delay time from a timing of the master offset value when the master offset value substantially loops back within the slave device after the slave device has received the master offset value within the delay measuring signal to a transmission timing of the delay measuring signal within the frame signal generated by the slave device.

3. The delay measurement system as claimed in claim 1 wherein when a plurality of slave devices are connected in cascade, one slave device adds the internal delay time of its own device associated with the frame signal generation to an offset value from the master device or the slave device at a preceding stage to make the slave offset value and transmits a frame signal in which the delay measuring signal is updated with the slave offset value to the slave device at a subsequent stage or the preceding stage.

4. The delay measurement system as claimed in claim 3 wherein the internal delay time of the slave device comprises a delay time until a transmission timing of the delay measuring signal within the frame signal generated by the slave device after the slave device has received the master offset value or the slave offset value within the delay measuring signal.

5. The delay measurement system as claimed in claim 3 wherein the slave device is provided with, by extracting an object device address set within the frame signal, a selector which selects either a loopback mode or a through mode.

6. The delay measurement system as claimed in claim 1 wherein the delay measuring signal stores the offset value only at a setting timing in an overhead within a first frame signal.

7. The delay measurement system as claimed in claim 1 wherein the delay measuring signal stores the offset value at a setting timing in an overhead within a plurality of frame signals.

8. The delay measurement system as claimed in claim 6 wherein the master device transfers the calculated delay time to the slave device.

9. The delay measurement system as claimed in claim 1 wherein frame signals generated by the master device and slave device have a same format.

10. A master device comprising:
    an interface transmitting a delay measuring signal to a slave device at a fixed timing relative to a synchronous pattern signal in an overhead; and
    a delay controller generating the delay measuring signal and calculating a delay time between the master device and the slave device by subtracting a slave offset value from a time difference between a timing at which the delay measuring signal within the frame signal transmitted from the slave device is received and the delay measurement start timing.

11. A slave device comprising:

an interface adding an interval delay lime of its own device associated with a frame signal generation to a master offset value after having received from a master device a frame signal into which a delay measuring signal is inserted at a fixed timing relative to a synchronous pattern signal in an overhead to make a slave offset value and transmitting to the master device a frame signal which is the delay measuring signal updated wit the slave offset value; and a delay controller updating the delay measuring signal.

\* \* \* \* \*